Dec. 20, 1938.  C. E. ATTWOOD  2,141,121
METHOD OF AND MEANS FOR BLANKING, NOTCHING, AND SCORING SHEETS
Filed Oct. 22, 1937   12 Sheets-Sheet 1
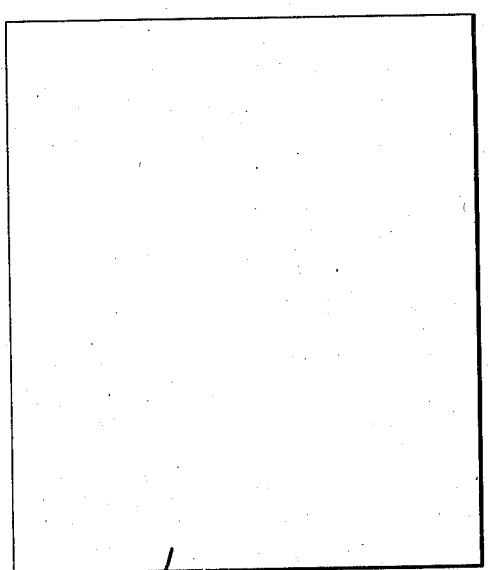
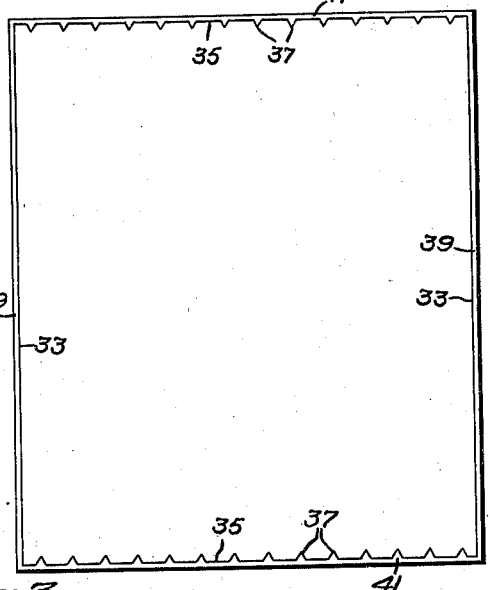
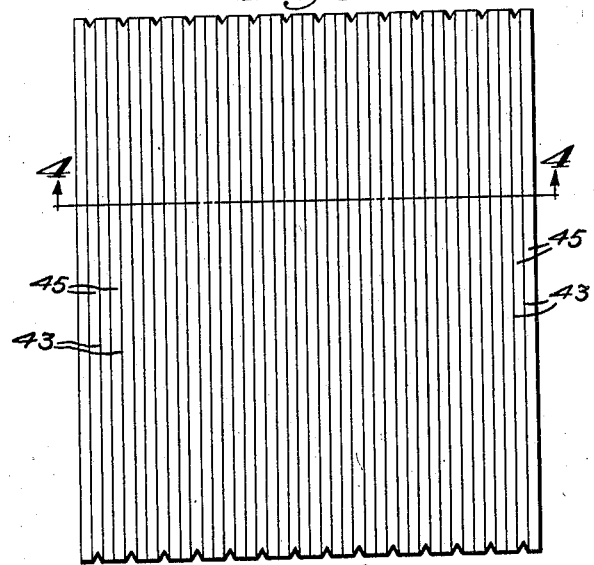
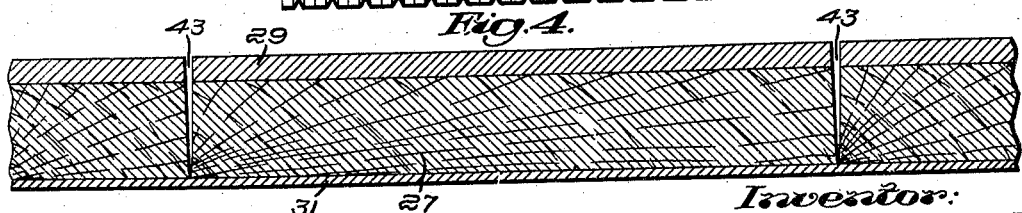

Dec. 20, 1938.   C. E. ATTWOOD   2,141,121
METHOD OF AND MEANS FOR BLANKING, NOTCHING, AND SCORING SHEETS
Filed Oct. 22, 1937   12 Sheets-Sheet 2

Inventor:
Charles E. Attwood,
by Emery, Booth, Townsend, Nichols & Weidner
Attys

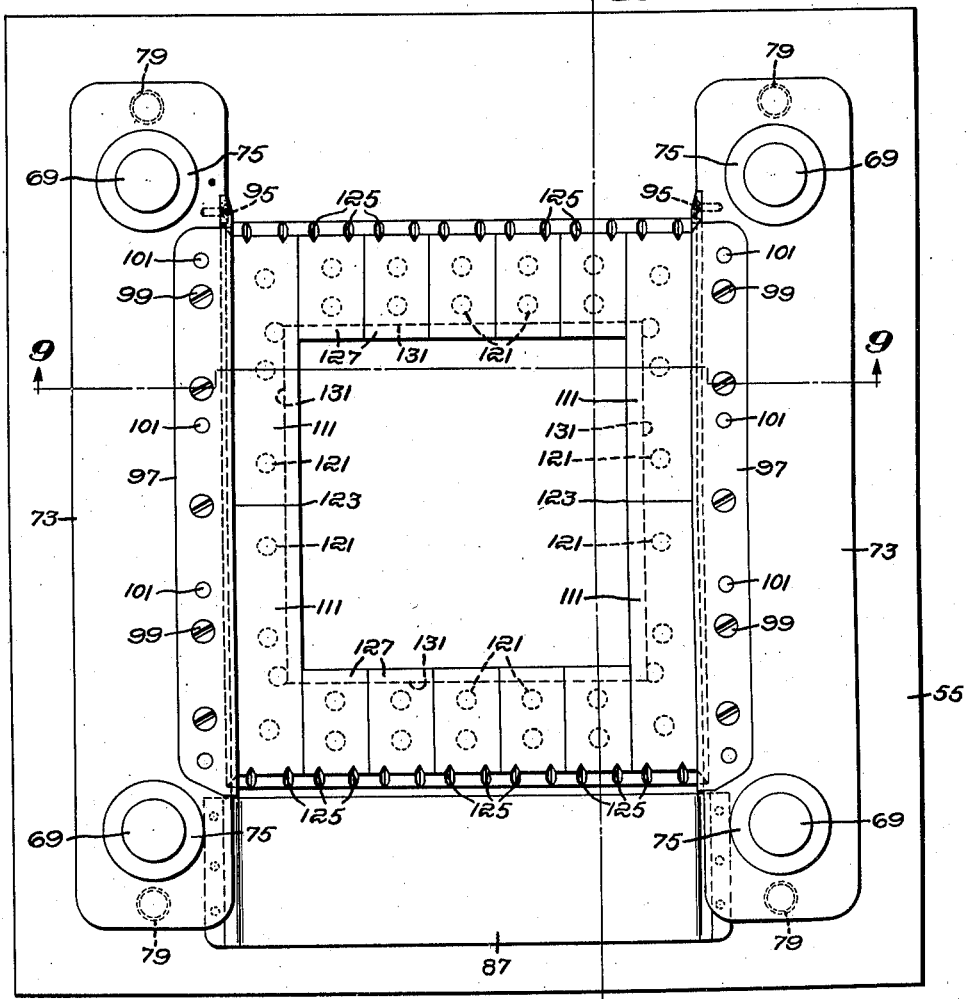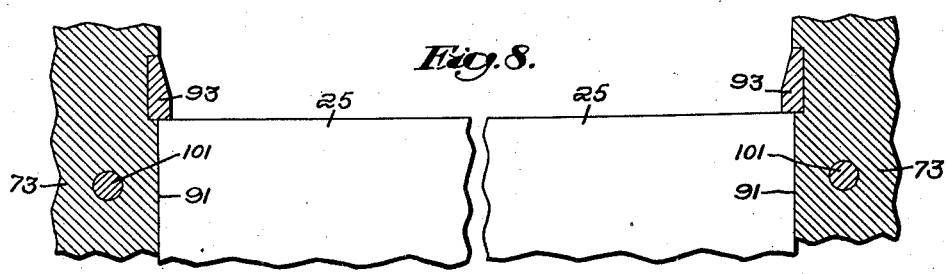

Dec. 20, 1938.    C. E. ATTWOOD    2,141,121
METHOD OF AND MEANS FOR BLANKING, NOTCHING, AND SCORING SHEETS
Filed Oct. 22, 1937    12 Sheets-Sheet 4
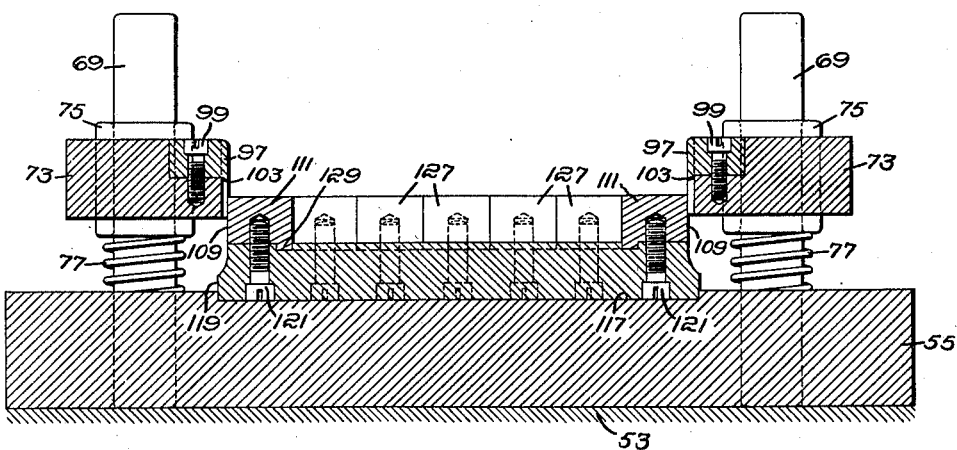
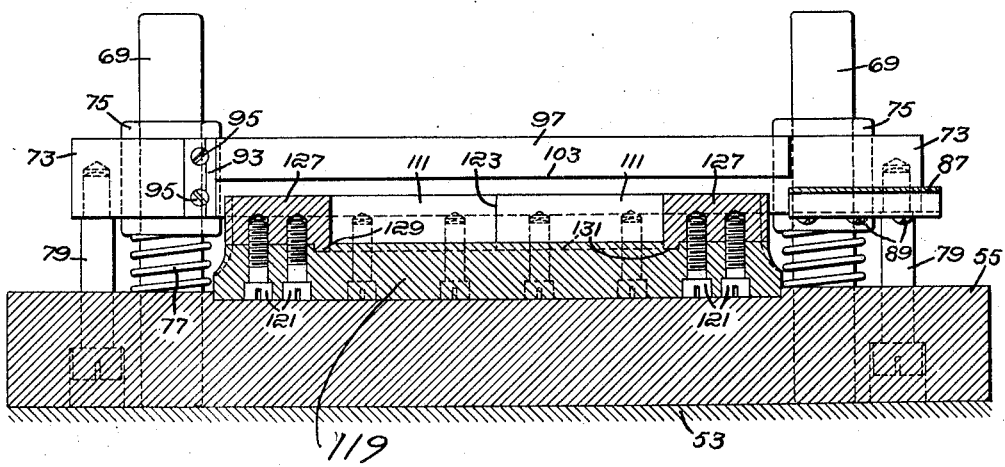
Inventor:
Charles E. Attwood,
by Emery, Booth, Townsend, Miller & Neisser
Attys Dec. 20, 1938.  C. E. ATTWOOD  2,141,121
METHOD OF AND MEANS FOR BLANKING, NOTCHING, AND SCORING SHEETS
Filed Oct. 22, 1937  12 Sheets-Sheet 5
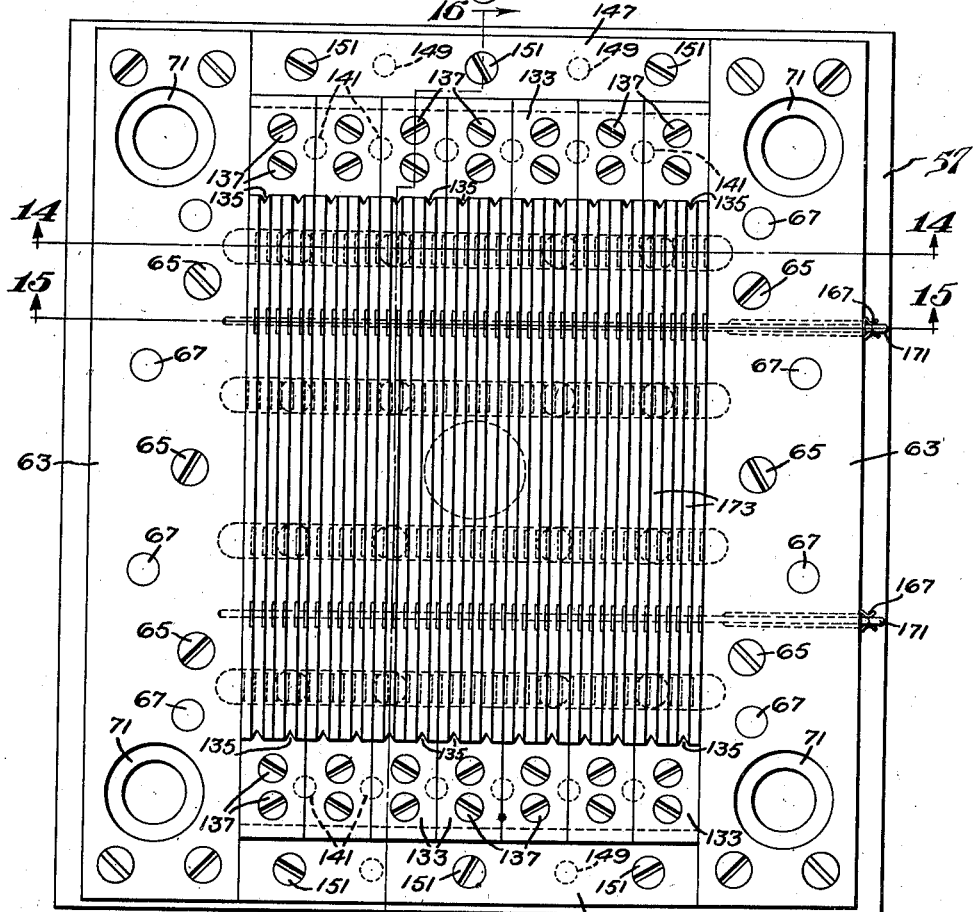
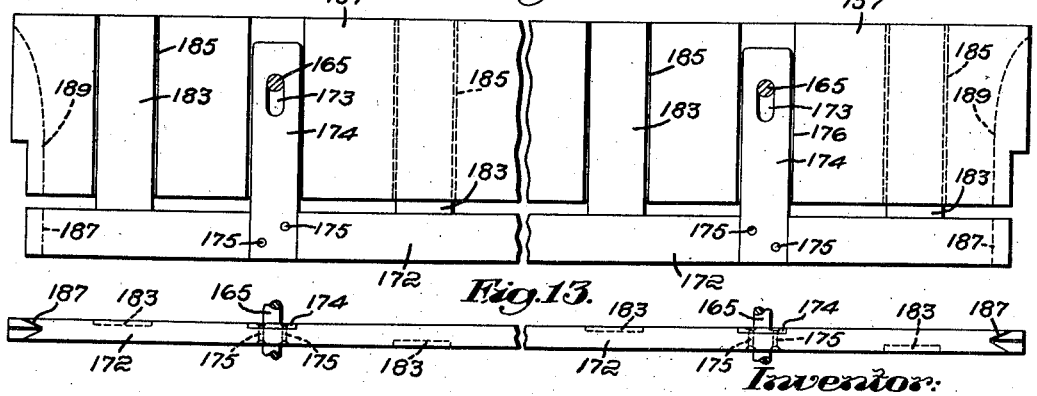
Inventor:
Charles E. Attwood,
by Emery, Booth, Townsend, Miller & Neubeck
Attys

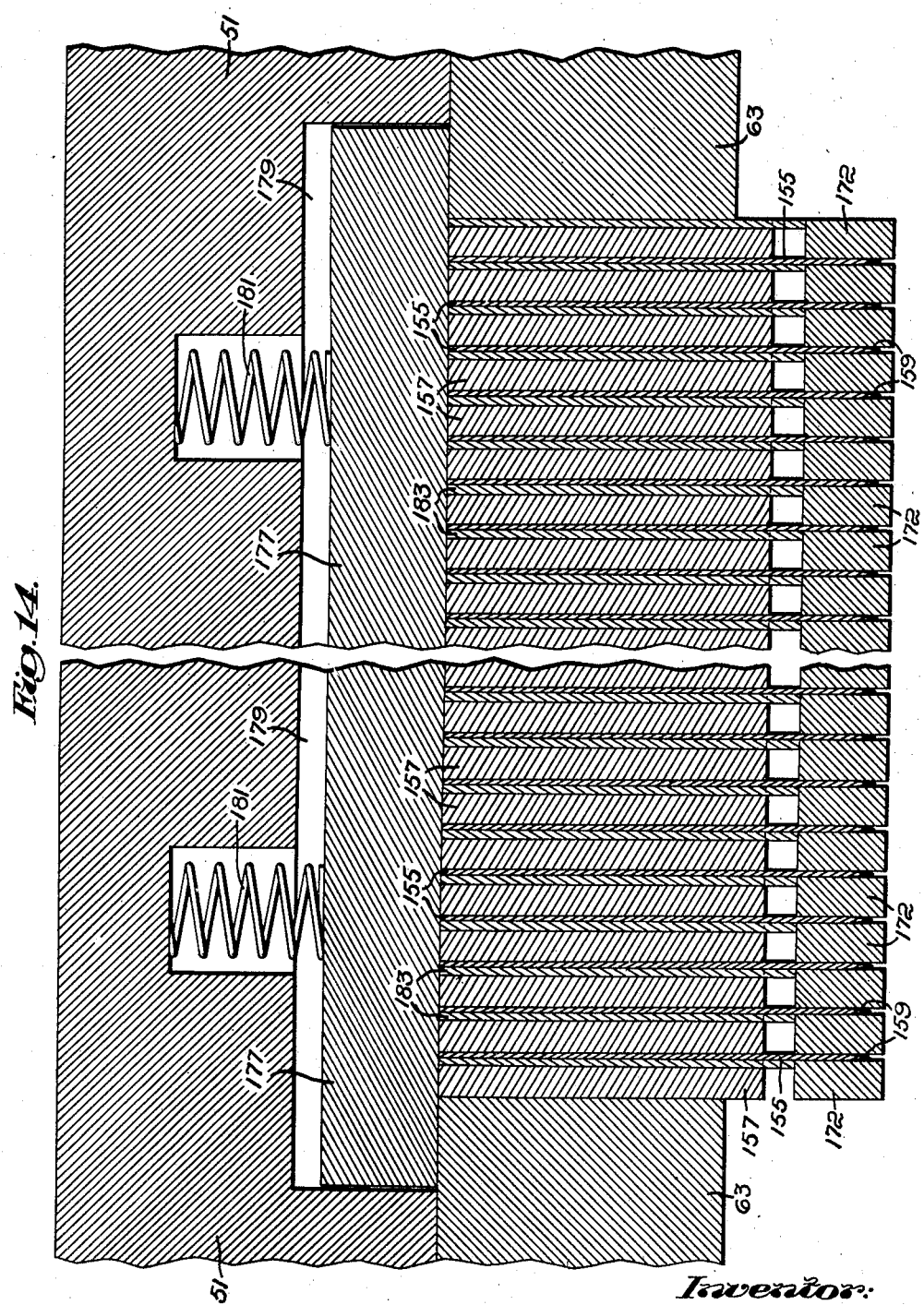

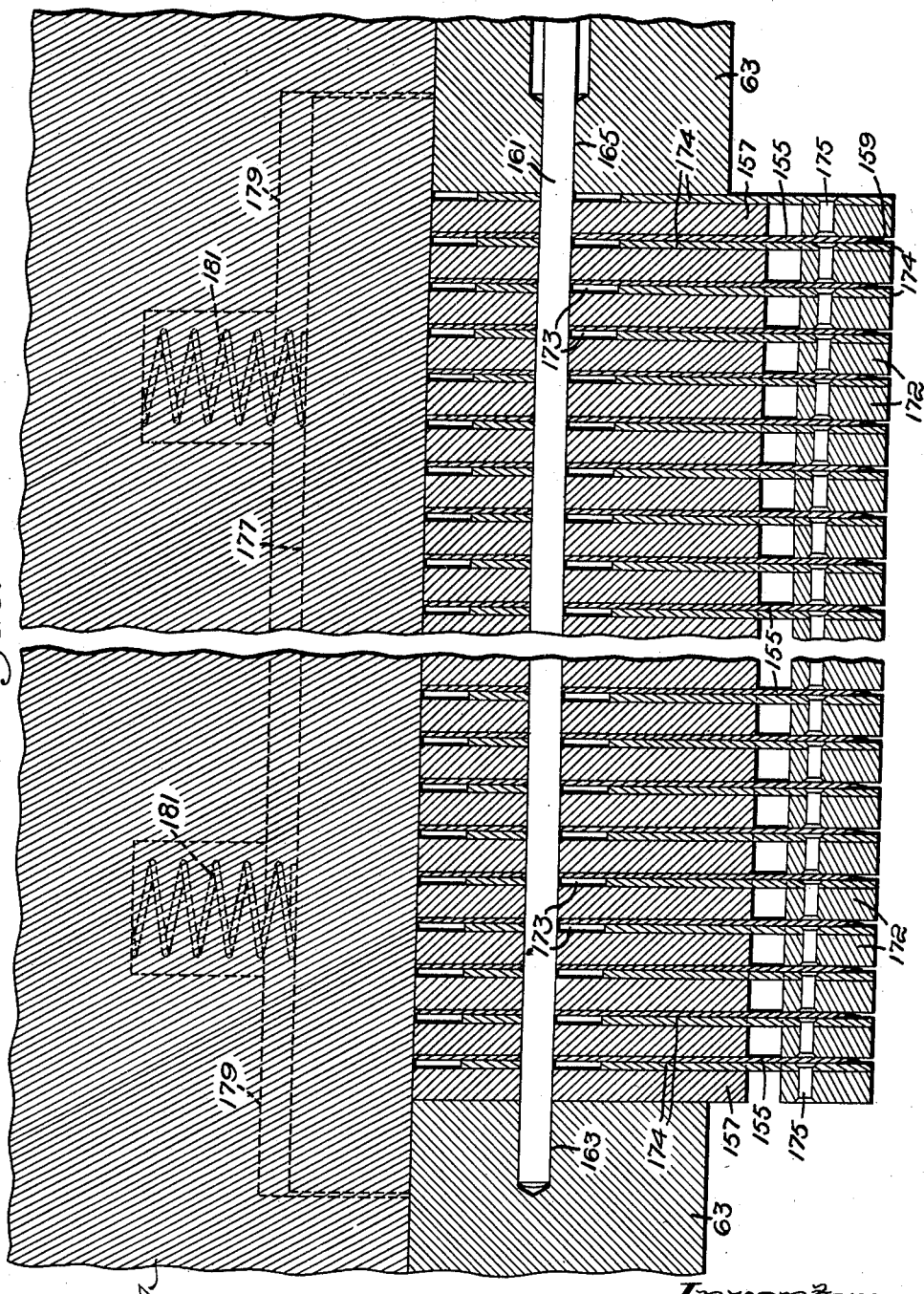

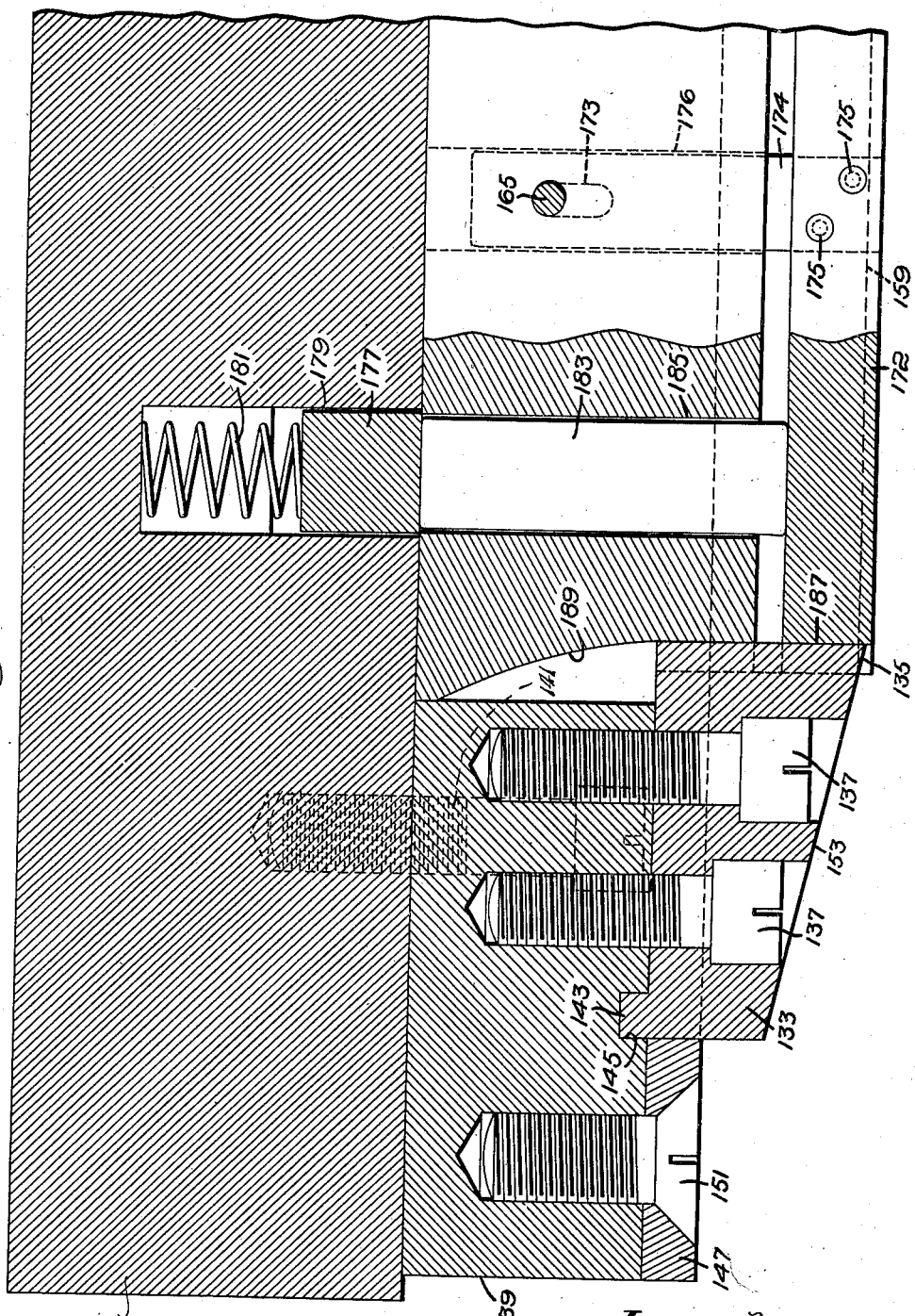

Dec. 20, 1938. C. E. ATTWOOD 2,141,121
METHOD OF AND MEANS FOR BLANKING, NOTCHING, AND SCORING SHEETS
Filed Oct. 22, 1937 12 Sheets-Sheet 9

Inventor:
Charles E. Attwood,
by Emery, Booth, Townsend, Miller & Weidner.
Attys Dec. 20, 1938. C. E. ATTWOOD 2,141,121
METHOD OF AND MEANS FOR BLANKING, NOTCHING, AND SCORING SHEETS
Filed Oct. 22, 1937 12 Sheets-Sheet 10
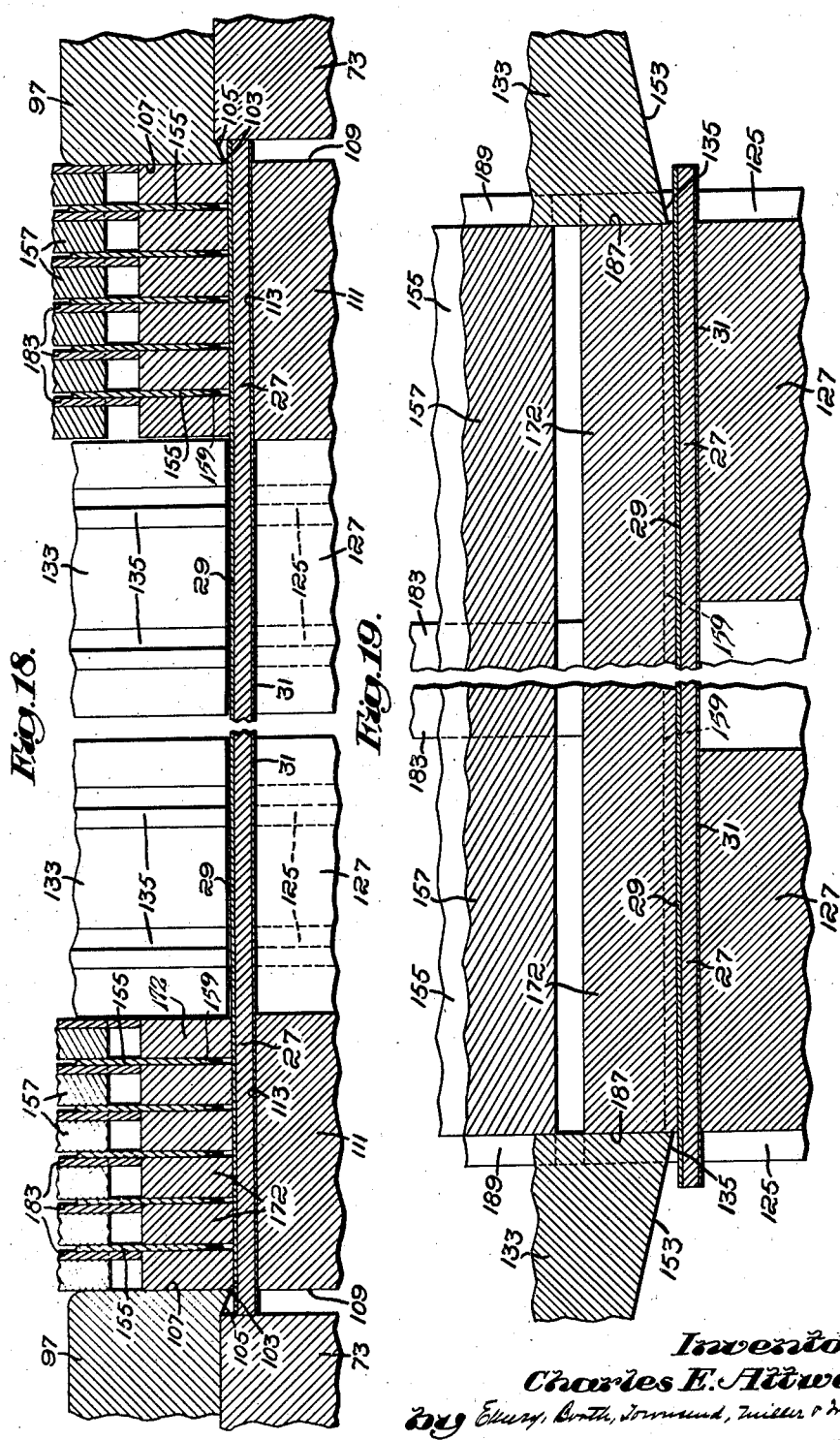

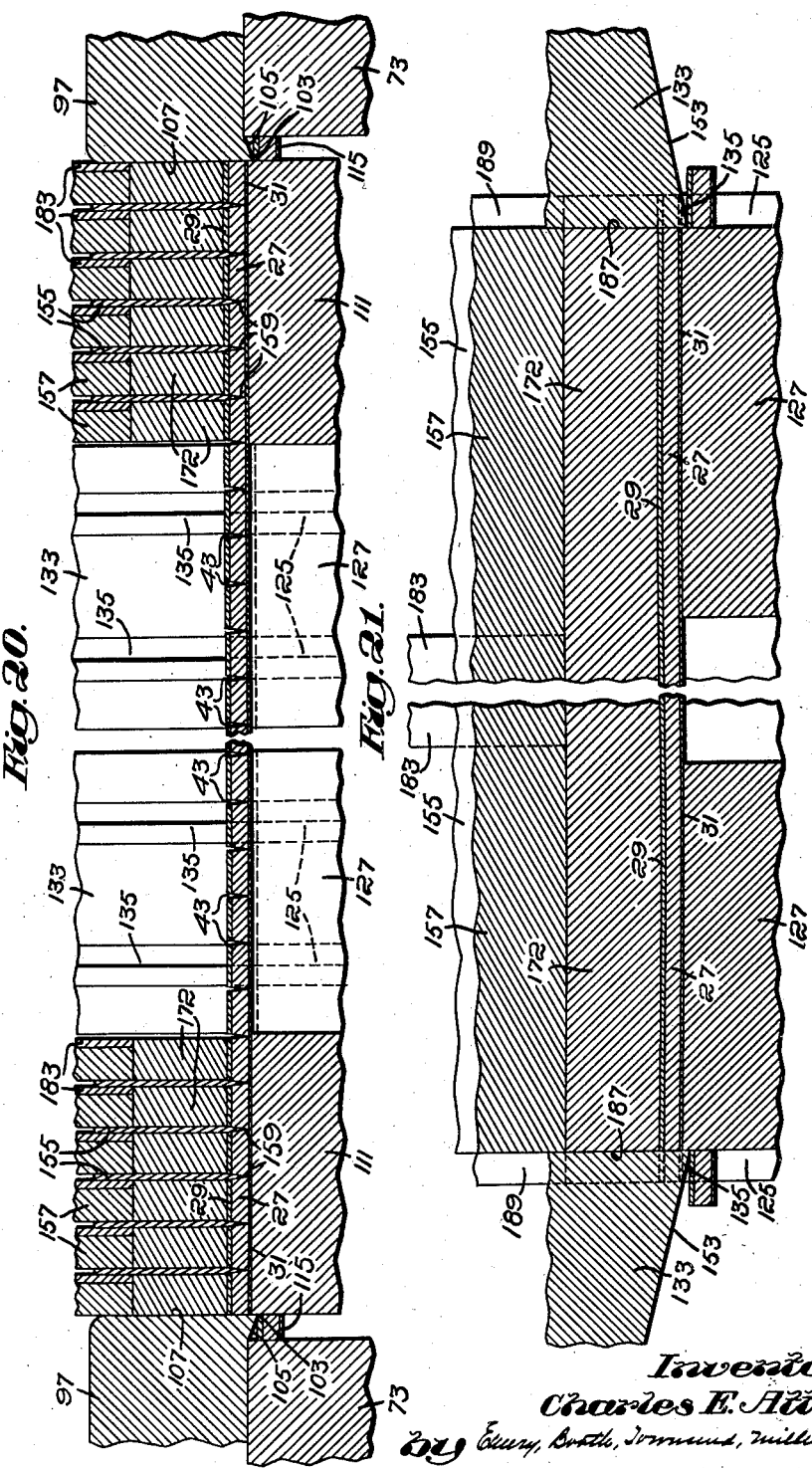

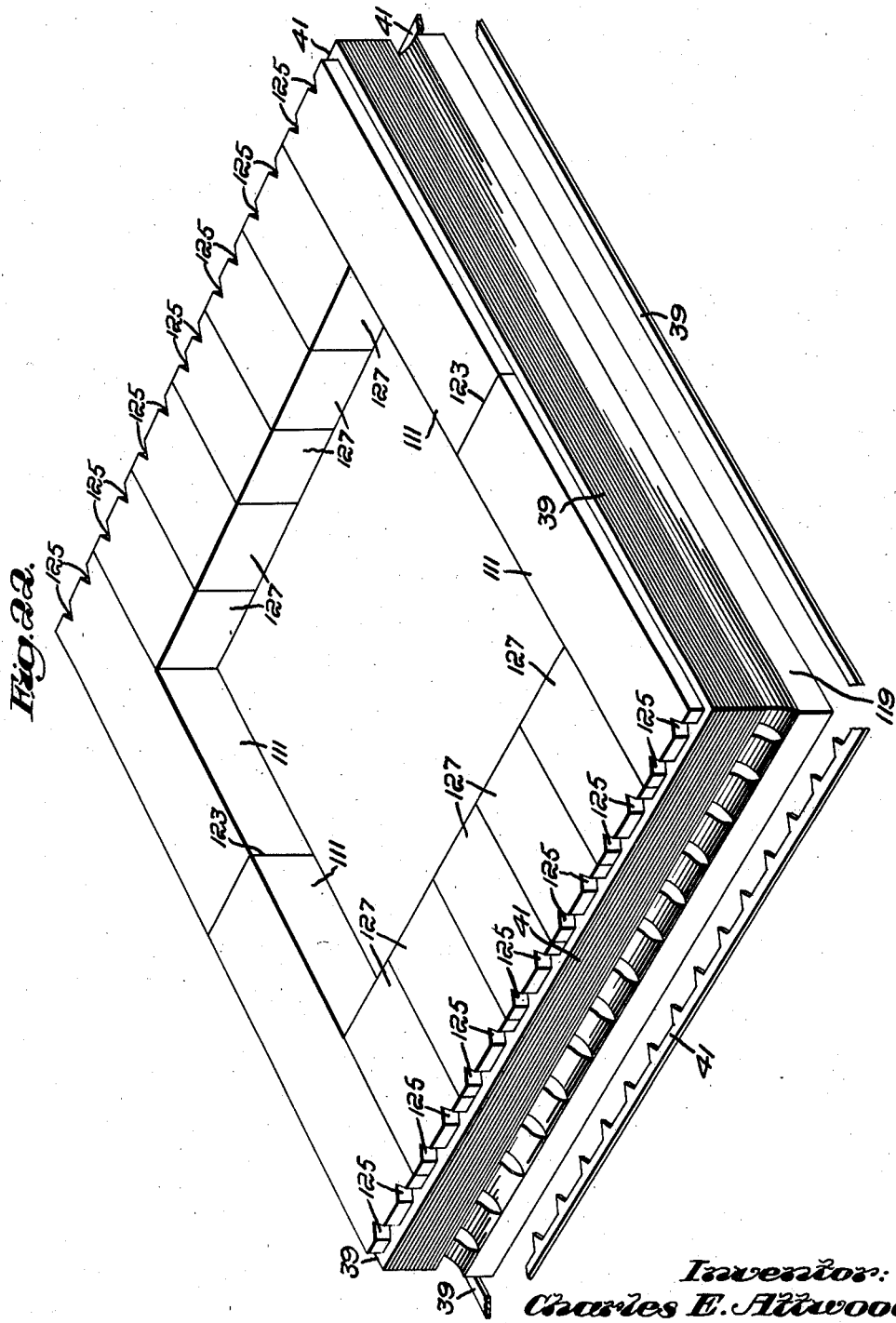

Patented Dec. 20, 1938

2,141,121

UNITED STATES PATENT OFFICE 2,141,121

METHOD OF AND MEANS FOR BLANKING, NOTCHING, AND SCORING SHEETS

Charles E. Attwood, Lakewood, N. Y., assignor to Art Metal Construction Company, Jamestown, N. Y., a corporation of Massachusetts Application October 22, 1937, Serial No. 170,378

31 Claims. (Cl. 164—13)

This invention relates to a novel method of and means for blanking sheets accurately to size, notching them along two opposite edges, and scoring them along parallel lines perpendicular to the notched edges. It is important that the sheets be cut accurately to size, perfectly square, that the notches be cut accurately, and that the score lines be parallel and accurately spaced because, subsequently, the sheets are to be edge-butted and secured end to end by tapes adhesively secured thereto to form a web which is to be fed by engagement with the notches to a machine which prints lines of characters between the score lines, after which the sheets are severed along the score lines to form index slips.

The sheet material which is employed in the present example is a composite sheet comprising wood veneer to one face of which is adhesively secured a sheet of paper of considerable substance, such as ledger stock, while a sheet of thin and easily ruptured paper is adhesively secured to the opposite face.

The preferred method may be carried out by means other than those disclosed herein, which, however, are preferred because of the extreme accuracy which is possible by their use. Briefly and generally stated, the method contemplates starting with a rectangular sheet whose dimensions are greater than the finished product, severing the sheet along two parallel lines, thus removing small strips of waste material and leaving the sheet with two smooth opposite edges, severing and simultaneously notching the sheet along the two remaining edges, thus removing small strips of waste material, and scoring the sheet deeply along parallel lines perpendicular to the notched edges. In carrying out the method with the means disclosed herein, all of these operations are conveniently performed by a single stroke of a set of dies.

The invention will best be understood by reference to the following description of the preferred method and the preferred means for carrying out the method, while its scope will be pointed out more particularly in the appended claims.

In the drawings:

Fig. 1 is a plan (on a reduced scale, as compared with actual size) of a composite sheet which is to be cut to the required dimensions, notched and scored;

Fig. 2 is a plan, on the same scale, showing the sheet cut to size and notched along two edges;

Fig. 3 is a plan, also at the same scale, showing the completed product with its parallel, scored lines perpendicular to the notched edges;

Fig. 4 is a sectional view (very greatly enlarged as compared with actual size) on line 4—4 of Fig. 3;

Fig. 7 is a plan of the lower set of instrumentalities;

Fig. 8 is a plan, partly in horizontal section, on an enlarged scale, of some of the parts shown in Fig. 7, illustrating the lateral guides and the front stops against which the sheet is placed and positioned in readiness for the blanking, notching and scoring;

Fig. 9 is a sectional view on line 9—9 of Fig. 7;

Fig. 10 is a sectional view on line 10—10 of Fig. 7;

Fig. 11 is a plan of the upper dies, inverted;

Fig. 13 is a bottom plan of the parts shown in Fig. 12;

Fig. 14 is a sectional view on an enlarged scale on line 14—14 of Fig. 11;

Fig. 15 is a sectional view on an enlarged scale on line 15—15 of Fig. 11;

Fig. 16 is a sectional view on an enlarged scale on line 16—16 of Fig. 11;

Fig. 17 is a perspective view illustrating some of the trimming and notching dies, together with one of the strippers and associated parts;

Fig. 18 is a sectional view on line 18—18 of Fig. 5, illustrating the stock in place between the upper and lower lets of dies and after partial descent of the upper instrumentalities;

Fig. 19 is a sectional view on line 19—19 of Fig. 6, with the parts as in Fig. 18;

Fig. 20 is a sectional view similar to Fig. 18 but showing the parts as they appear at the completion of the operation, i. e., with the upper dies in their lowermost position;

Fig. 21 is a sectional view similar to Fig. 19, but with the parts in the same position as in Fig. 20; and Fig. 22 is a perspective view of the lower set of dies and the block to which they are secured, illustrating the rupturing of the corners of the waste rectangle.

Figure 5:
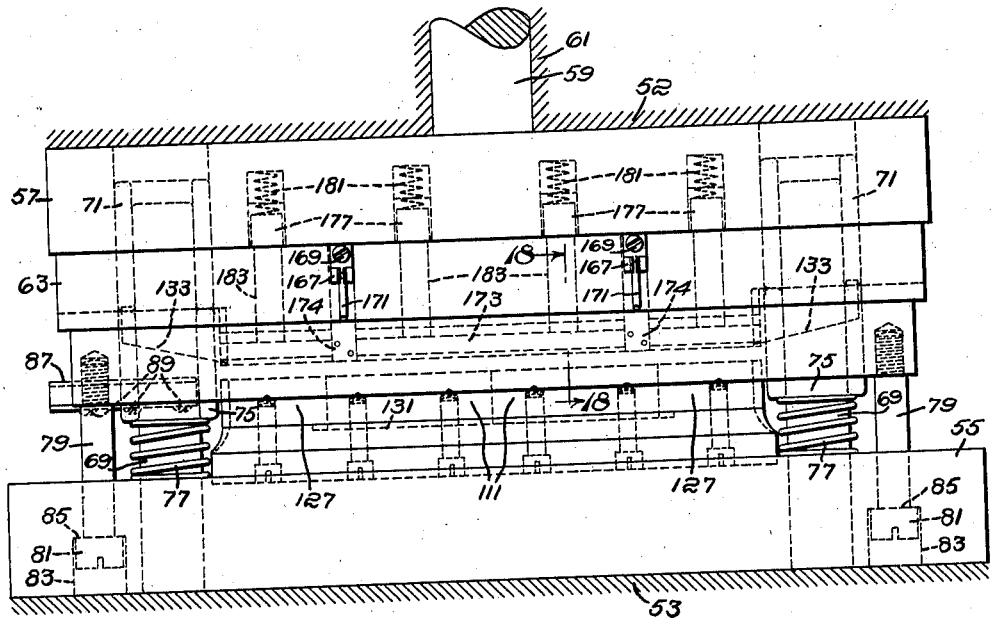
Fig. 5 is a side elevation of the preferred means for carrying out the method.

Referring to the drawings and to the method and means illustrated therein by way of example, and having reference at first to Figs. 1 to 4 inclusive, there is shown in Fig. 1 a rectangular sheet 25 of appropriate material which, in the example shown, is composite or laminated, i. e., it comprises, as shown in Fig. 4, a sheet 27 of wood veneer, a top layer 29 of paper, herein of considerable substance, which is to serve as a writing or printing surface, and a bottom layer 31 of paper, herein relatively thin and easily ruptured so that after the writing or printing has been completed, the sheet can be broken along scored lines to form narrow strips for filing in a panel having channels into which the ends of the strips may be inserted by springing the strips.

The dimensions of the sheet (except its thickness) are greater than those of the completed article, and the method contemplates trimming the sheet by severing the same along two parallel lines 33, 33 (see Fig. 2) and also severing the same along two parallel lines 35, 35, and also notching the sheet as at 37, preferably at the same time. This leaves a single, rectangular and closed frame-like piece of waste stock having two opposite sides 39 and two opposite sides 41, and as will later appear, the waste stock is broken at the four corners so that it becomes four separate pieces.

The invention also contemplates scoring the sheet along parallel lines 43 (see Figs. 3 and 4) herein rather closely spaced, so as to form narrow strips 45 which, however, remain united by the thin paper 31. The scoring, in the present example, is accomplished by a gang of thin knives acting simultaneously to produce all the score lines at one stroke. In this example, the scoring takes place after and closely following the trimming and notching operation, and by the use of the preferred dies the entire operation of trimming, notching, and scoring is accomplished in a single stroke of the dies and knives.

This method produces a finished article of extreme accuracy, suitable for the subsequent operations which form no part of the present invention.

Figure 6:
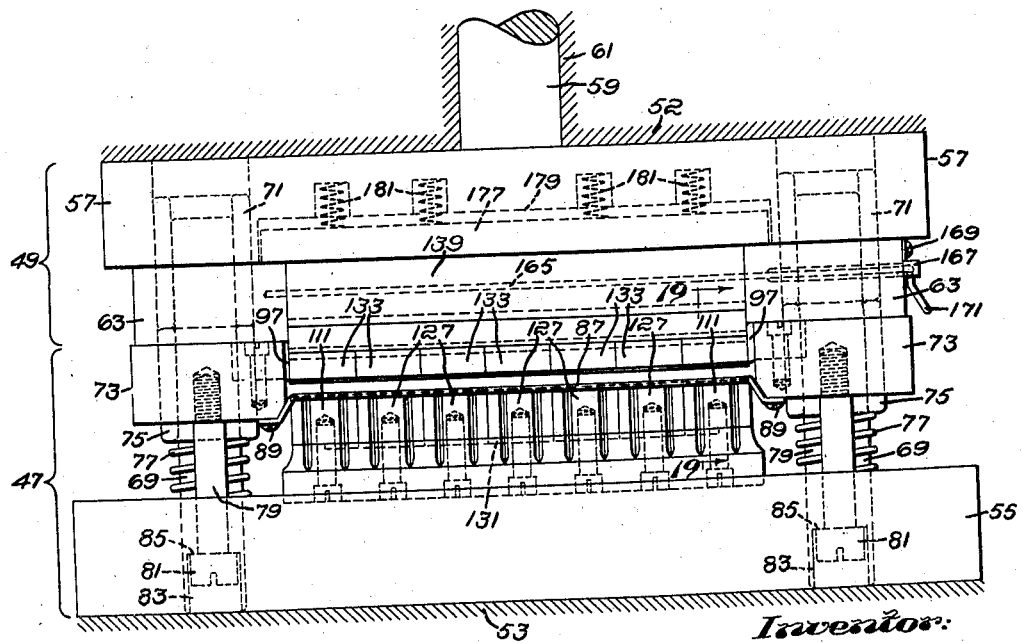
Fig. 6 is a front elevation of the same.

Turning now to the preferred means for performing these operations and having reference, at first, to Figs. 5 and 6, the invention contemplates the use of lower and upper sets 47 and 49 of cooperating instrumentalities conveniently operated by placing them between upper and lower members 52 and 53 (only partially shown) of a suitable press, such as a "dinking" press. In the preferred form of press the upper and lower parallel members, forming a "couple" are obliquely arranged and the waste stock, as well as the completed articles, gravitate from the machine because of the downward slope of the bed of the machine.

In the example shown, the lower set of instrumentalities includes a rather heavy, massive block 55, and the upper set of instrumentalities includes a heavy, massive block 57, the latter having secured thereto a stud 59 snugly received in a hole 61 in the upper member 52 of the press. The upper set includes also two heavy bars 63 which, as seen in Fig. 11, are conveniently secured to the block 57 as by screws 65 and dowel pins 67.

To maintain the upper and lower sets in proper registration and to guide the upper set vertically, four vertical studs 69 are rigidly anchored in the lower block 55 and extend upwardly into bushings 71 which are fixedly secured partly in the upper block 57 and partly in the bars 63 which, it will be remembered, are secured to the block 57. The bars 63 (see Figs. 5 and 6) rest upon and are supported by vertically movable bars 73 in which are fixedly secured bushings 75 slidable vertically on the studs 69.

The upper set is normally sustained in its uppermost position shown in Figs. 5 and 6 by springs 77 disposed about the studs 69 between the lower block 55 and the lower ends of the bushings 75. Upward movement of the bars 73 under the influence of these springs is conveniently limited by studs 79 threaded at their upper ends into the bars 73 and having at their lower ends heads 81 received in counter-bored holes 83 presenting shoulders 85 against which the heads are normally maintained by the springs 77. The depth of the holes 83 is more than great enough for the required vertical travel of the bars 73 under the influence of the descending upper set of instrumentalities.

The lower set will now be described in detail, reference being had at first to Figs. 5 and 6. The lower bars 73 are connected to each other by a plate 87 conveniently attached to the lower faces of the bars (see Fig. 6) by screws 89, and the intermediate portion of the plate is offset upwardly to the proper level to support the sheet 25 and to guide the latter between opposed, parallel faces 91 of said bars (see Fig. 8). As the sheet is advanced between the faces 91, the corners of its front edge engage stops 93 suitably secured as by screws 95 (see Fig. 7) to the bars 73. The sheet is now properly positioned for the subsequent operations.

Above the lateral edges of the sheet, are two cutter bars 97 sunk flush into the bars 73, respectively, (see Fig. 7) and suitably secured thereto as by screws 99 and located by dowel pins 101. These cutter bars (see Fig. 9) have cutting edges 103 which overhang the lateral margins of the sheet and are spaced apart a distance equal to the final width which is desired for the sheet. As shown, the overhanging portions of the cutter bars slope downwardly as at 105 (see Fig. 18) to enable the cutting edges 103 to penetrate the sheet 25. Inner faces 107 of the cutter bars are in the same planes (i. e. they coincide) with outer faces 109 of dies 111, having upper faces 113 upon which the sheet 25 rests, so that, when the cutter bars descend from the normal position shown in Fig. 18 to the position shown in Fig. 20, the cutting edges 103 shear off the marginal portions of the sheet and produce waste strips 115 which drop down the sides of the dies 111.

The lower set of notching dies will now be described, reference being had at first to Figs. 9 and 10. The block 55 is provided in its upper face with a shallow recess 117 which receives a base 119 serving as a mounting for the lower set of dies, and to those base the dies presently to be described are secured as by screws 121 threaded into the dies.

Referring now to Fig. 7, the dies 111 are, for convenience, each made in two pieces butted end to end along a line 123. Each of these pieces is provided at one end with two notches 125, herein V-shaped, and like pairs of notches are provided in other dies 127 arranged edge to edge in two rows, with the notches in one row facing in the opposite direction from the notches in the other row, i. e., the notches face outwardly on two sides of a rectangle formed by the outer edges of the dies 111 and the dies 127. The dimensions of this rectangle are the same as the dimensions of the completed article shown in Fig. 3. The dies are accurately located by providing each with a downwardly directed tongue 129 (see Figs. 9 and 10) and by providing the base 119 with four grooves 131 forming a rectangle. The tongues snugly fit the grooves and the dies engage one another edge to edge, and in this way the dies are accurately located.

The upper set of dies will now be described, reference being had at first to Fig. 11 which shows two rows of dies 133 each provided with two V-shaped tongues 135 corresponding with and arranged to enter the hereinbefore described V-shaped grooves 125 of the lower dies. The dies 133 (see Fig. 16) are secured as by screws 137 to a bar 139 which, in turn, is secured as by screws 141 to the block 51. To position the dies accurately, each is provided with a tongue 143 (see Fig. 16) and each bar 139 is provided with a groove 145 which snugly receives the several tongues of the dies associated with that bar. Referring again to Fig. 11, each group of dies is backed by a strip 147 located by dowel pins 149 and secured to the bar 139 by screws 151. As shown in Fig. 16, the lower face 153 slopes downwardly to the points of the V-shaped tongues 135 to enable the latter the better to enter the sheet.

The cooperative action of the upper and lower notching dies and the cutter bar is well illustrated in Fig. 17 in which one corner of the sheet 25 is indicated in dotted lines as it will rest upon the upper faces of the lower dies and will extend beneath the upper dies and beneath the cutter bar, so that when the upper dies and the cutter bar descend, the sheet will be trimmed and notched.

The scoring knives will now be described, reference being had at first to Fig. 15 in which it appears that there is a gang of parallel knives 155 spaced apart by spacers 157, all interposed between the two bars 63. The upper edges of the knives and the spacers rest against the bottom face of the upper block 57. The knives have cutting edges 159, all in a horizontal plane, the level of which (see Figs. 18 and 19) is at such a height that the cutting edges enter the sheet after the hereinbefore described trimming and notching operation. The knives and the spacers are conveniently held in place as by rods 161, one of which is shown in Fig. 15, passing through all of them and extending through holes 163 and 165 in the bars 63. These rods are conveniently held in place (see Fig. 6) by spring clips 167 attached to the side of the adjacent bar 63 as by screws 169, and the rods are provided with handles 171 to facilitate insertion and withdrawal of the rods.

Figure 12:
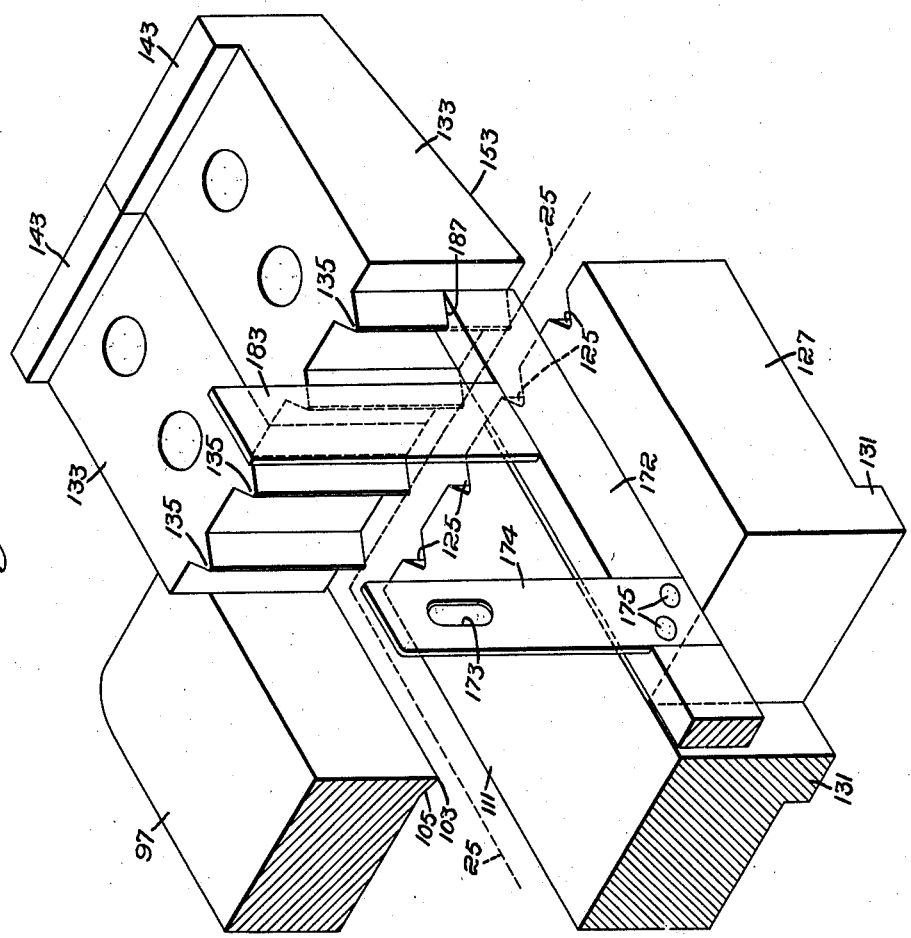
Fig. 12 is an elevation of one of the knife-spacers with its associated stripper and other parts, some of which are also illustrated in Fig. 11.

To strip the completed article from the knives, there are strippers 172 (see Figs. 12 and 13) which are below and spaced from the spacers 157, respectively. These strippers are arranged to reciprocate vertically a distance which is limited by the fact that the rods 165 extend through slots 173 in slides 174 conveniently secured to each stripper by rivets 175. The slides are received in shallow grooves 176 in the associated spacer 157.

The strippers are normally urged downwardly by presser bars 177, one of which is shown in Fig. 14, received in a recess 179 in the upper block 51, and above each bar there are several springs 181 which press the bar downwardly upon the upper ends of thin, flat plungers 183 whose lower ends press downwardly, each upon the top of one of the strippers 172. The plungers are loosely received in channels 185 (see Fig. 12) in the associated spacer 157. Descent of the strippers, under the influence of the springs, is, as stated, limited by the rods 165 in the slots 167. To strip the completed article from the upper notching dies, the ends of each stripper are provided with V-shaped notches 187 (and the spacer is provided with similar notches 189) to receive the V-shaped tongues 135 (see Fig. 16) on the dies 153. The operation will be clearly apparent from an examination of Fig. 17 which shows one of the strippers with its associated slide and plunger.

The method and the mode of operation of the preferred means should be clear from the foregoing description but will be recapitulated briefly. Referring to Figs. 7 and 8, a sheet 25 is laid upon the plate 87 and is pushed forwardly between the guides 91 until its front corners engage the stops 93. Power is then applied to the press whose upper member 57 descends, carrying with it the upper set of instrumentalities.

Referring now to Figs. 18 and 19, the strippers 172 descend upon the sheet and firmly hold it in place. The cutting edges 103 descend upon the sheet and at practically the same time the tongues 135 of the dies 133 descend upon the sheet, thus trimming the sheet on all four edges and notching it at the same time. During the same downward stroke, the knives 155 descend and their cutting edges 159 penetrate the sheet to the desired depth which is easily predetermined by adjustment of the stroke of the press or by a "build-up" below the lower set of dies.

It will be remembered that the waste stock from the trimming operation is a closed, frame-like piece. As trimmings on successive sheets take place, this waste stock will accumulate about the lower die, and it is important to break this frame-like waste at its four corners so as to produce four separate pieces which can easily be disposed of. To this end, the base 119 on which the lower dies are mounted, is flared outwardly on all four sides (compare Figs. 9 and 10) so that the pressure of the descending column of frame-like trimmings will cause them to be stretched laterally and ruptured at the four corners.

It will also be remembered that the dies are mounted in a sloping position, (downwardly from the operator). As a result, the waste pieces at the right and left of the operator, and at the rear (the far side) will gravitate out of the way. Those at the front (toward the operator) can be swept out of the way from time to time by the operator's hand.

If it were not for the rupturing and removal of the waste about the lower die, the accumulation would soon prevent descent of the upper die. Thus, it will be understood that the disposition of the waste is important.

Having thus described one method and one means by which the method may be carried out, but without limiting myself thereto, what I claim and desire by Letters Patent to secure is:

I claim:

1. The method of operating on a rectangular sheet, which comprises severing the sheet along lines intermediate two opposite margins to remove strips therefrom, and simultaneously notching the body of the sheet between the lines.

2. The method of operating on a rectangular sheet, which comprises simultaneously trimming two opposite margins, and simultaneously trimming and notching the remaining opposite margins.

3. The method of operating on a rectangular sheet, which comprises simultaneously trimming two opposite margins, simultaneously trimming and notching the remaining opposite margins, and scoring the sheet along parallel lines transverse to the notched margins.

4. The method of operating on a rectangular sheet, which comprises trimming all four margins, notching two opposite margins, and scoring the sheet along parallel lines transverse to the notched margins, all in a single stroke of the operating instrumentalities.

5. In a machine for operating on a rectangular sheet, the combination of means for locating the sheet by engagement with two opposite edges and with a third edge, and means for notching said third edge.

6. In a machine for operating on a rectangular sheet, the combination of means for locating a sheet by engagement with three edges, and means for notching two opposite edges.

7. In a machine for operating on a rectangular sheet, the combination of means for locating a sheet by engagement with three edges, and means for trimming two opposite edges and trimming and notching the two remaining opposite edges.

8. In a machine for operating on a rectangular sheet, the combination of means for locating the sheet by engagement with two opposite edges, and notching the two remaining opposite edges.

9. In a machine for operating on a rectangular sheet, the combination of means for locating the sheet by engagement with two opposite edges and with a third edge, and means for trimming said opposite edges.

10. In a machine for operating on a rectangular sheet, the combination of means having opposed faces for engagement with two opposite edges, means having two aligned faces for engagement with a third edge of the sheet, and means for trimming said opposite edges.

11. In a machine for operating on a rectangular sheet, the combination of means having opposed faces for engagement with two opposite edges, means having two aligned faces for engagement with a third edge of the sheet, and means for trimming all four edges.

12. In a machine for operating on a rectangular sheet, the combination of means having opposed faces for engagement with two opposite edges, means having two aligned faces for engagement with a third edge of the sheet, and means for notching said third edge and the fourth edge.

13. In a machine for operating on a sheet, the combination of abutments for engagement with opposite edges of the sheet, and two generally parallel sets of severing and notching instrumentalities for severing and notching the sheet along two lines extending transversely of said edges.

14. In a machine for operating on a sheet, the combination of abutments for engagement with opposite edges of the sheet, means for trimming said sheet along two parallel lines, and means for trimming the sheet along two parallel lines transversely of the first mentioned parallel lines, and notching said sheet along the second mentioned parallel lines.

15. In a machine for operating on a sheet, the combination of abutments for engagement with opposite edges of the sheet, means for trimming said sheet along two parallel lines lengthwise of said edges, and means for severing the sheet along two lines transverse to said edges and notching said sheet along the last mentioned two lines.

16. In a machine for operating on a sheet, the combination of means for locating the sheet by engagement with two opposite edges, means for severing said sheet along lines transverse to said edges, and means for scoring the sheet along lines parallel with said edges.

17. In a machine for operating on a sheet, the combination of means for locating the sheet by engagement with two opposite edges, means for severing said sheet along lines transverse to said edges, means for notching said sheet along said lines, and means for scoring the sheet along lines parallel with said edges.

18. In a machine for operating on a sheet, the combination of a die structure having two outwardly and oppositely facing, parallel surfaces and a third surface upon which the sheet may be placed with two opposite edges overhanging said parallel surfaces, two abutments having inwardly facing, parallel surfaces spaced from said outwardly facing surfaces and arranged to position said edges, and two cutter bars having cutting edges aligned with said outwardly facing surfaces, respectively, and to cooperate therewith to sever the sheet along lines parallel with said edges.

19. In a machine for operating on a sheet, the combination of a die structure having two outwardly and oppositely facing, parallel surfaces and a third surface upon which the sheet may be placed with two opposite edges overhanging said parallel surfaces, two abutments having inwardly facing, parallel surfaces spaced from said outwardly facing surfaces and arranged to position said edges, means to position a third edge of the sheet, and two cutter bars having cutting edges aligned with said outwardly facing surfaces, respectively, and to cooperate therewith to sever the sheet along lines parallel with said opposite edges.

20. In a machine for operating on a sheet, the combination of a die structure having two outwardly and oppositely facing, parallel surfaces and a third surface upon which the sheet may be placed with two opposite edges overhanging said parallel surfaces, two bars having inwardly facing, parallel surfaces spaced from said outwardly facing surfaces and arranged to position said edges, two stops on said bars and having aligned surfaces to position a third edge of the sheet, and two cutters carried by said bars, respectively, and having cutting edges aligned with said outwardly facing surfaces, respectively, and to cooperate therewith to sever the sheet along lines parallel with said opposite edges.

21. In a machine for operating on a sheet, the combination of two cooperating, relatively reciprocable die structures, one having two opposite, outwardly facing surfaces, and the other having two opposite, inwardly facing surfaces aligned with said outwardly facing surfaces, respectively, said die structures being provided, one with two sets of notches and the other with two sets of projections to enter said notches, respectively, arranged along said surfaces.

22. In a machine for operating on a sheet, the combination of two cooperating, relatively reciprocable die structures, one having two opposite, outwardly facing surfaces, and the other having two opposite, inwardly facing surfaces aligned with said outwardly facing surfaces, respectively, the one having outwardly facing surfaces being provided with two sets of notches along such surfaces, respectively, and the one having inwardly facing surfaces being provided with two sets of projections along such surfaces, respectively, to enter said notches, respectively.

23. In a machine for operating on a sheet, the combination of a support for the sheet, a gang of scoring knives spaced apart, a gang of strippers disposed in the spaces between said knives, means yieldingly to press said strippers against the sheet and to urge the latter toward said support, and a carrier to thrust said knives toward said support and into the sheet.

24. In a machine for operating on a sheet, the combination of a support for the sheet, a carrier arranged to reciprocate toward and from said support, a gang of scoring knives carried by said carrier, spacers between said knives, strippers between said knives, a presser carried by said carrier, plungers interposed between said presser and said strippers, respectively, and resilient means urging said presser against said plungers and said plungers toward said support.

25. In a machine for operating on a sheet, the combination of a support for the sheet, a carrier arranged to reciprocate toward and from said support, a gang of scoring knives carried by said carrier, spacers between said knives, strippers between said knives, a presser carried by said carrier, plungers interposed between said presser and said strippers, respectively, and resilient means urging said presser against said plungers and said plungers toward said support, and means to limit the movement of said strippers under the influence of said plungers.

26. In a machine for operating on a sheet, the combination of a support for the sheet, a carrier arranged to reciprocate toward and from said support, a gang of scoring knives carried by said carrier, spacers between said knives, strippers between said knives, a presser carried by said carrier, plungers interposed between said presser and said strippers, respectively, resilient means urging said presser against said plungers and said plungers toward said support, and means to limit the movement of said strippers under the influence of said plungers, said means including slides attached to said pressers, respectively, and provided with slots, and a rod extending through said slots.

27. In a machine for operating on a sheet, the combination of two relatively reciprocable die structures, one having four external surfaces bounding the four sides of a rectangle, and the other having two internal surfaces bounding two sides of the same rectangle, two cutter bars having cutting edges to cooperate with the two external surfaces at the remaining two sides of the rectangle to sever the sheet along two margins, the die structure having said external surfaces being provided with a series of notches, and the die structure having said internal surfaces being provided with a corresponding series of projections to enter said notches, said notches and said projections being arranged along the first mentioned sides of said rectangle.

28. In a machine for operating on a sheet, the combination of two relatively reciprocable die structures, one having four external surfaces bounding the four sides of a rectangle, and the other having two internal surfaces bounding two sides of the same rectangle, two cutter bars having cutting edges to cooperate with the two external surfaces at the remaining two sides of the rectangle to sever the sheet along two margins, the die structure having said external surfaces being provided with a series of notches, and the die structure having said internal surfaces being provided with a corresponding series of projections to enter said notches, said notches and said projections being arranged along the first mentioned sides of said rectangle, a gang of scoring knives spaced apart and carried by the die structure having said internal surfaces, a gang of strippers disposed in the spaces between said knives, means yieldingly to press said strippers toward said die structure having said external surfaces.

29. In a machine for operating on a sheet, the combination of two relatively reciprocable die structures, one having four external surfaces bounding the four sides of a rectangle, and the other having internal surfaces bounding the sides of the same rectangle, said die structures being arranged to sever from the sheet a rectangular, frame-like piece of waste, and means for causing said frame-like piece to be ruptured at its four corners.

30. In a machine for operating on a sheet, the combination of two relatively reciprocable die structures, one having four external surfaces bounding the four sides of a rectangle, and the other having internal surfaces bounding the sides of the same rectangle, said die structures being arranged to sever from the sheet a rectangular, frame-like piece of waste, and means for causing said frame-like piece to be ruptured at its four corners, said means comprising a base which supports the first-named die structure and is provided with outwardly flared sides which utilize the relative motion of the die structures and the accumulation of the pieces of waste to expand the latter laterally.

31. The method of operating on a rectangular sheet, which comprises simultaneously trimming from opposite margins of the sheet strips each having a series of straight edges and tongues alternating with said straight edges, thereby to leave the body of the sheet with opposite margins having straight edges alternating with notches.

CHARLES E. ATTWOOD.